Patented Mar. 18, 1924.

1,487,647

UNITED STATES PATENT OFFICE.

GIACOMO FAUSER, OF NOVARA, ITALY.

PROCESS OF RECOVERING NITROGEN FROM RESIDUAL AMMONIA OXIDATION GASES.

No Drawing. Application filed April 11, 1922. Serial No. 551,730.

*To all whom it may concern:*

Be it known that I, GIACOMO FAUSER, residing at Novara, Italy, have invented new and useful Improvements in Processes of Recovering Nitrogen from Residual Ammonia Oxidation Gases, of which the following is a specification.

It is known that by the oxidation of ammonia, nitric acid can be obtained. The fundamental reactions can be represented by the following equations:

(1) $2NH_3 + 7O = 2NO_2 + 3H_2O$.
(2) $2NO_2 = N_2O_4 + 12.8$ cal.
(3) $N_2O_4 + H_2O = HNO_3 + HNO_2$.
(4) $3HNO_2 = HNO_3 + 2NO + H_2O$.
(5) $NO + O = NO_2 + 19.9$ cal.

From the first one I deduce that the ratio between the weights of oxygen and ammonia must be equivalent to $$\frac{112}{34},$$

therefore using atmospheric air which contains 23 per cent oxygen, the ratio between air and ammonia will be in weight equivalent to $$\frac{112}{34} \times \frac{100}{23} = 14 \text{ (about)}.$$

To the neccessary oxygen for oxidizing the ammonia is to be added that necessary to the successive reoxidation of NO to $NO_2$ because, as shown by the above equations the reaction permits in each cycle the transformation into $HNO_3$ only of two thirds of the $N_2O_4$ present while the remainder returns to the form of NO which is to be reoxidized. I calculate easily that such supplemental oxygen is about 0.17 kg. per kg. of $NO_2$, and as 1 kg. of ammonia by oxidization gives 2.7 kg. of $NO_2$, the ratio between the weight of oxygen and the weight of ammonia used will be of $0.17 \times 2.7 = 0.459$ and therefore the weight of the corresponding air will be:

$$0.459 \times \frac{100}{23} = 2 \text{ (about)}$$

To sum up the ratio between ammonia and air will be by weight 1:16. Practically in order to favor the successive reoxidations of the oxides of nitrogen, a greater proportion of air is present, say about 19 or 20 times the weight of ammonia used, and it has been suggested by some one to introduce still a certain quantity of supplemental air in the oxidation towers. This method however has the drawback of further diluting the oxides and consequently of making their absorption more difficult and slower; therefore it is not recommendable.

It has been suggested that for absorbing 99% of the oxides of nitrogen which are in the gases, it should be necessary to repeat the cycle at least 9 times in succession but as the concentration of the oxides of nitrogen diminishes, the regeneration of $N_2O_4$ becomes increasingly difficult, so that even resorting to absorption towers with alkaline solutions instead of water, the recovery of the oxides of nitrogen can never be complete.

To sum up from the above observations, the gases leaving the last absorption device, always contain traces of oxides of nitrogen but these gases are chiefly composed of nitrogen; the oxygen is contained in variable proportions from about 4 to 5% according to the initial composition of the air-ammonia mixture.

I propose to utilize such gases for the production of pure nitrogen, which can be used for producing synthetic ammonia, calcium cyanamide and for other purposes.

In order to diminish the final contents of oxygen it is convenient to limit the amount of air as much as is consistent with securing a good yield of nitric acid. The theoretical ratio being, as already calculated, 16 kg. per kg. of ammonia.

For eliminating the oxygen a sufficient small percentage of hydrogen is added to the residual gases from the oxidation of ammonia, thence they are brought into contact with a platinum coil, which is maintained incandescent by the electric current. This causes the combustion of hydrogen with oxygen forming water vapor, which is condensed and separated. Traces of the NO are decomposed if the temperature of the catalyst is high enough, into oxygen and nitrogen. However it is well to remark that in contrast to the oxygenated compounds of carbon, oxides of nitrogen have no destructive action on the catalyzers used for the synthesis of ammonia. The small amount of oxides of nitrogen can be more advantageously recovered by passing the mixture of gas with hydrogen over a suitable catalyzer, which may be platinized asbestos, at a lower temperature. The following reaction takes place:

$$NO + 3H_2 = NH_3 + H_2O.$$

In this way nearly all the nitrogen contained in the gases is recovered in the form of ammonia. Also the oxygen present is eliminated by passing over the catalyzer to form $H_2O$ (water vapor) and the condensation of this removes the $NH_3$. There remains then the pure nitrogen, which is thus produced at a very low price.

By increasing opportunely the proportion of hydrogen we can directly obtain the mixture $N_2 + 3H_2$ required by the synthesis of ammonia.

The advantage of resorting to residual gases of the oxidation of ammonia for producing nitrogen is evident if we consider the small amount of oxygen contained therein in comparison with the content atmospheric air. In fact it results that for producing 1 kg. of nitrogen by burning the oxygen of the air it is necessary to consume about 430 liters of hydrogen, and considering that 6 kw. hours are required for the production of $1m^3$. of H by the electrolysis of the water, the output of energy per kg. of nitrogen produced is 2.6 kw. hours.

On the contrary resorting to residual gases of the oxidation of ammonia and assuming that they contain 4% oxygen (percentage which may be still diminished) 67 liters of hydrogen will be sufficient for producing 1 kg. of nitrogen, and therefore the output of energy consumed only about kw. hour 0.40.

Now what I claim is:

In the production of free nitrogen from the exit gases from the oxidation of ammonia and subsequent oxidation and absorption of nitrogen oxide, which exit gases contain oxygen and nitrogen and a proportion of oxygen which is only a minor fraction of the content of oxygen in air, and which exit gases may also contain a much smaller percentage of an oxide of nitrogen, which comprises adding hydrogen in amount at least chemically equivalent to the oxygen present and passing the gas mixture in contact with a catalyzer at a temperature at which free oxygen and hydrogen combine to form water, then separating the water.

GIACOMO FAUSER.